United States Patent [19]
Gauharou

[11] Patent Number: 5,558,792
[45] Date of Patent: Sep. 24, 1996

[54] HEATED WINDSHIELD WIPER BLADE WITH ELECTRIC HEATER CORE AND OUTWARDLY EXTENDING ARCHED BRANCH MEMBERS

[76] Inventor: Kenneth G. Gauharou, 10 Dolores Dr., Ringwood, N.J. 07456

[21] Appl. No.: 550,009

[22] Filed: Oct. 30, 1995

[51] Int. Cl.[6] .............................. H05B 3/00; B60S 1/04
[52] U.S. Cl. ...................... 219/202; 15/250.06; 219/540
[58] Field of Search ..................................... 219/202, 203, 219/530, 540; 15/250.06, 250.05

[56] References Cited

U.S. PATENT DOCUMENTS

| | | | |
|---|---|---|---|
| 3,249,959 | 5/1966 | Theckston | 219/203 |
| 3,428,883 | 2/1969 | Rickett | 219/203 |
| 3,936,901 | 2/1976 | Theckston | 219/203 |
| 4,497,083 | 2/1985 | Nielsen, Jr. et al. | 15/250.06 |
| 5,325,561 | 7/1994 | Kotlar | 15/250.06 |

Primary Examiner—John A. Jeffery

[57] ABSTRACT

A heated windshield wiper blade construction includes the use of a pair of integrally attached electrical heating elements which are in parallel alignment and which extend substantially through the entire axial length of a flexible wiper blade. One of the core members is of a triangularly shaped cross-sectional area which lessens relative rotational movement between the core member and the associated wiper blade. The triangular core member further includes a plurality of outwardly extending, arched branch members which operate to provide a spring-like engagement between the wiper blade and an associated support arm, while at the same time completing the electrical heating circuit. The second core member is of a circular cross-sectional area and is of a heavier and thicker construction than the triangularly shaped core member so as to reduce the electrical resistance and the consequent heating within this core member.

10 Claims, 3 Drawing Sheets

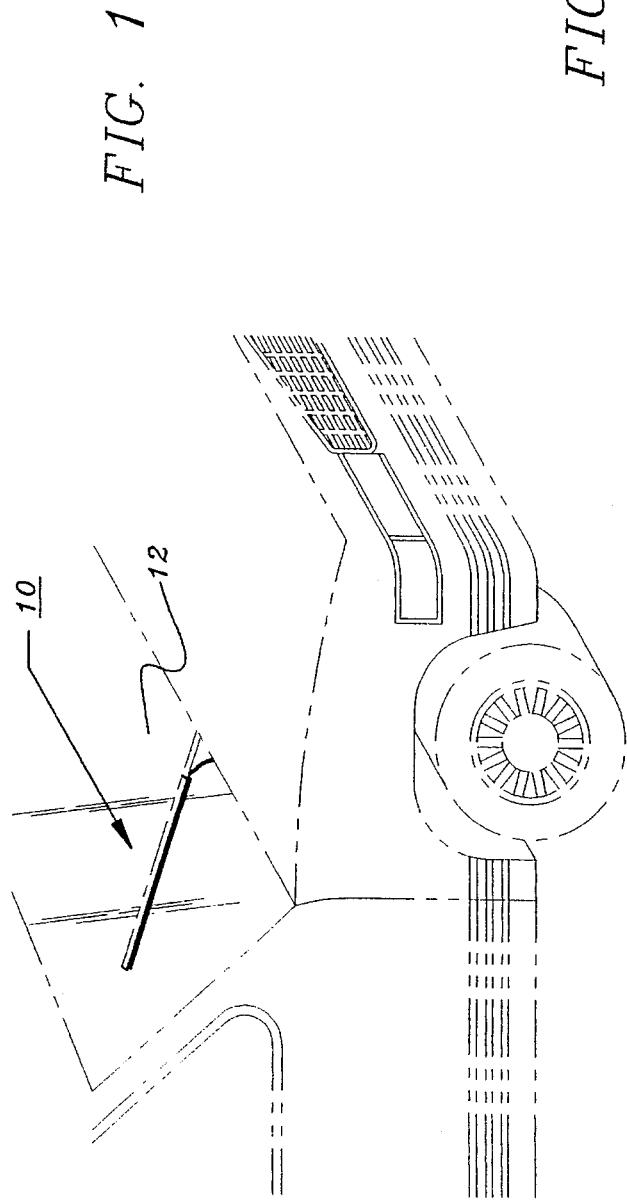
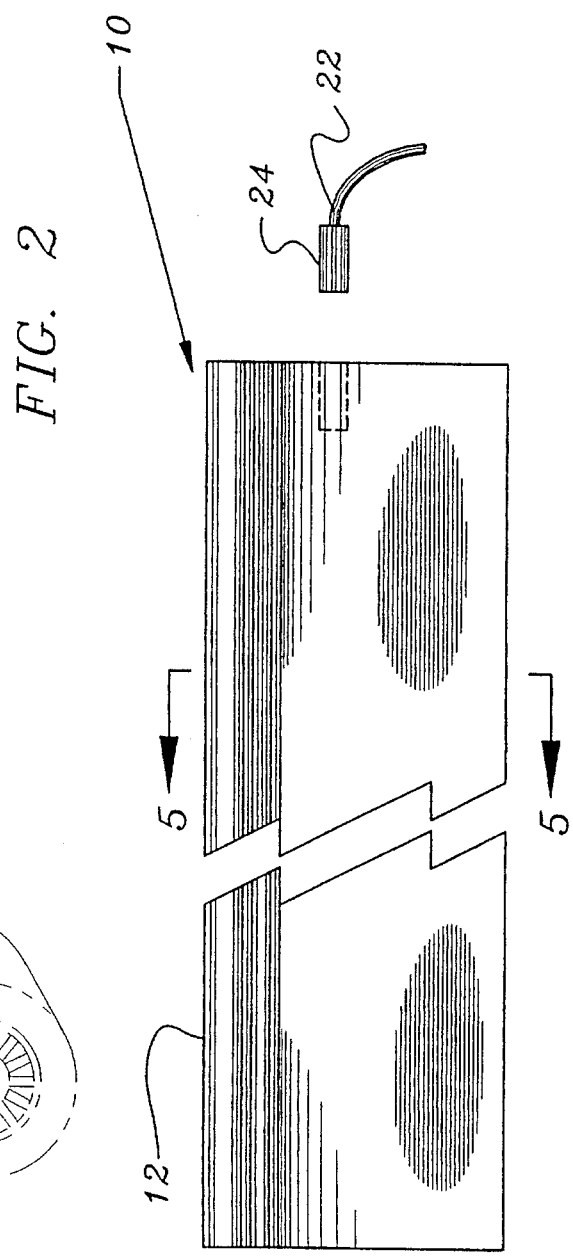

HEATED WINDSHIELD WIPER BLADE WITH ELECTRIC HEATER CORE AND OUTWARDLY EXTENDING ARCHED BRANCH MEMBERS

BACKGROUND OF THE INVENTION

1. Field of the Invention

The present invention relates to windshield wipers and more particularly pertains to a heated windshield wiper blade utilizable to melt snow, ice, and the like on a vehicle windshield.

2. Description of the Prior Art

The use of heated windshield wiper blades is known in the prior art. This is evidenced by the granting of a number of patents relating to various functional and structural aspects of heated windshield wiper blades. An example of known pertinent patents includes U.S. Pat. No. 5,325,561 which issued to Edward Kotlar on Jul. 5, 1994 and which discloses a typical heated flexible windshield wiper wherein a thin elongate and very flexible heater wire is disposed in and extends longitudinally throughout the body of the flexible wiper blade. Another example of a heated windshield wiper is to found in U.S. Pat. No. 4,497,083 which issued to Nielsen, Jr. et al. on Feb. 5, 1985. This patent is further representative of a large number of patents which relate to heated windshield wipers and wherein resistance wiring runs along the length of a wiper arm, the blade carrier, and the wiper blade for the purpose of heating the blade and carrier when connected into a vehicle electrical system.

While each of these prior art patents disclose devices which fulfill their respective particular objectives and requirements, and are most likely quite functional for their intended purposes, it will be noticed that none of these patents disclose a heated windshield wiper blade for heating windshields wherein the resistance wiring so utilized also functions as a spring-like retention means for holding a blade to blade carrier while further being shaped and configured to more efficiently dissipate heat within the blade per se.

As such, there apparently still exists the need for heated windshield wiper blades which utilize resistance wiring that serves the function of both frictionally gripping a blade to a blade carrier and also distributing heat throughout and entire blade assembly. In this respect, the present invention substantially fulfills this need.

SUMMARY OF THE INVENTION

In view of the foregoing disadvantages inherent in the known types of heated windshield wiper blades now present in the prior art, the present invention provides a heated windshield wiper blade wherein the same can be utilized to selectively heat windshields so as to prevent the build-up of ice, sleet and snow while at the same time facilitating a release of a wiper blade from a windshield when the same has been frozen thereto. As such, the general purpose of the present invention, which will be described subsequently in greater detail, is to provide a heated wiper blade apparatus and method which has many of the advantages of the heated windshield wiper blades mentioned heretofore and many additional novel features that result in a heated windshield wiper blade which is not anticipated, rendered obvious, suggested, or even implied by any of the prior art heated windshield wiper blades, either alone or in any combination thereof.

To attain this, the present invention generally comprises a heated windshield wiper blade construction that includes the use of a pair of integrally attached electrical heating elements which are in parallel alignment and which extend substantially through the entire axial length of a flexible wiper blade. One of the core members is of a triangularly shaped cross-sectional area which lessens relative rotational movement between the core member and the associated wiper blade. The triangular core member further includes a plurality of outwardly extending, arched branch members which operate to provide a spring-like engagement between the wiper blade and an associated support arm, while at the same time completing the electrical heating circuit. The second core member is of a circular cross-sectional area and is of a heavier and thicker construction then the triangularly shaped core member so as to reduce the electrical resistance and the consequent heating within this core member.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a heated windshield wiper blade and method which has many of the advantages of the heated windshield wiper blades mentioned heretofore and many novel features that result in a heated windshield wiper blade which is not anticipated, rendered obvious, suggested, or even implied by any of the prior art heated windshield wiper blades, either alone or in any combination thereof.

It is another object of the present invention to provide a heated windshield wiper blade which may be easily and efficiently manufactured and marketed.

It is a further object of the present invention to provide a heated windshield wiper blade which is of a durable and reliable construction.

An even further object of the present invention is to provide a heated windshield wiper blade which is susceptible of a low cost of manufacture with regard to both materials and labor, and which accordingly is then susceptible of low prices of sale to the consuming public, thereby making such heated windshield wiper blade economically available to the buying public.

Still yet another object of the present invention is to provide a heated windshield wiper blade which provides in the apparatuses and methods of the prior art some of the advantages thereof, while simultaneously overcoming some of the disadvantages normally associated therewith.

Still another object of the present invention is to provide a heated windshield wiper blade which facilitates the use of resistance wiring within a wiper blade that is shaped and configured to efficiently deliver heat throughout an entire wiper blade assembly.

Yet another object of the present invention is to provide a heated windshield wiper blade which utilizes resistance wiring within the wiper blade as a spring-like gripping-like means to facilitate an attachment of the wiper blade to a blade carrier.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of the heated windshield wiper assembly comprising the present invention.

FIG. 2 is a partial side elevation view of the heated wiper blade comprising the present invention.

DESCRIPTION OF PREFERRED EMBODIMENTS

Figure 3:
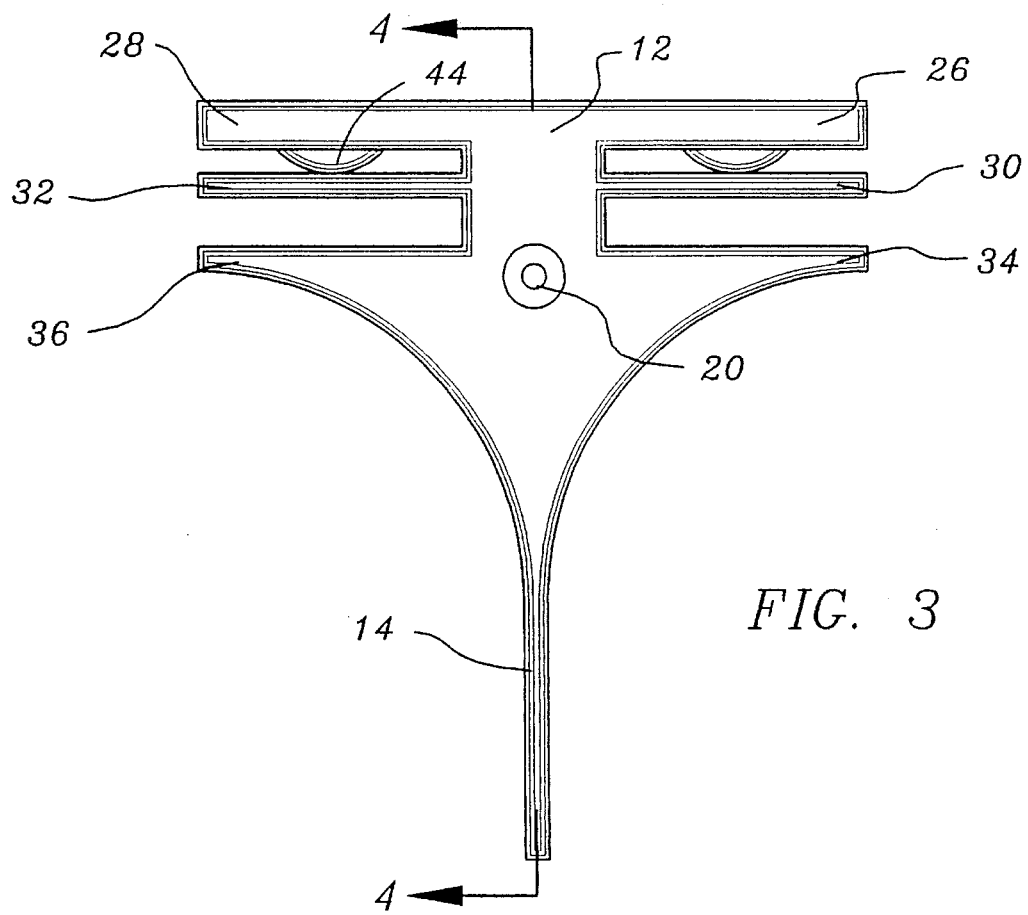
FIG. 3 is an end elevation view of the invention.

With reference now to the drawings, and in particular to FIGS. 1–3 thereof, a heated windshield wiper blade embodying the principles and concepts of the present invention and generally designated by the reference numeral 10 will be described.

Figure 4:
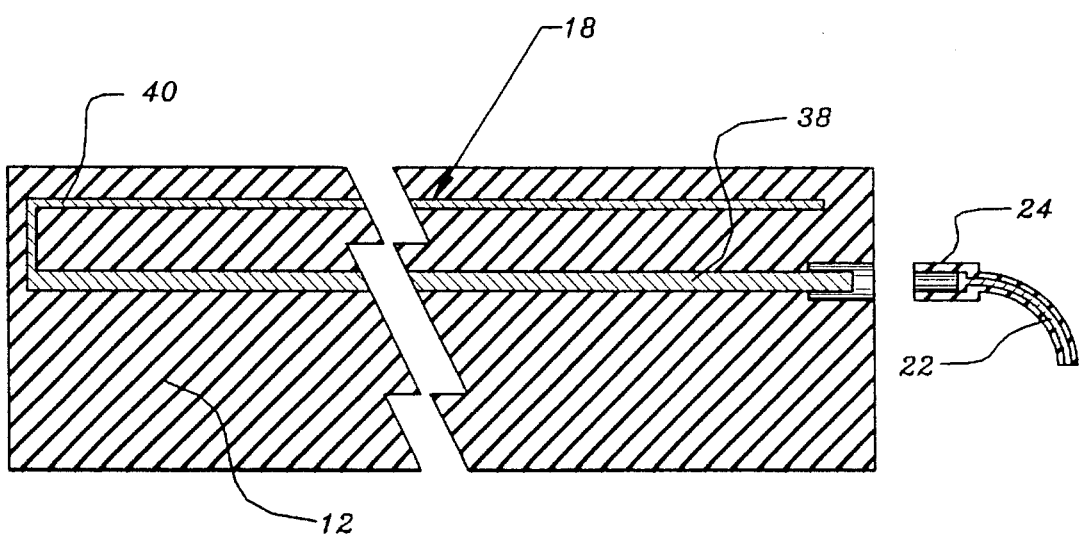
FIG. 4 is a cross-sectional view of the invention as viewed along the line 4—4 in FIG. 3.

More specifically, it will be noted that the heated windshield wiper assembly 10 essentially consists of a flexible polymeric blade member 12 which is of a somewhat conventional design and which includes a conventional wiper wing 14 designed to clean a vehicle windshield 16 in a well understood manner. Inasmuch as a wiper blade 12 may at times freeze to a windshield 16 during periods of inclement weather, electrical access to an internal heating element 18, as illustrated in FIG. 4, is facilitated by a electrical connector 20 positioned on a bottom end of the wiper blade 12. An electrical lead 22 and associated female connector 24 can be selectively engaged with the bayonet connector 20 so as to provide electrical energy to the heating element 18 in an understood manner.

As will be further noted, the blade 12, in addition to the wiper wing 14, includes a second opposed set of wiper wings 26, 28, a third set of opposed wings 30, 32, and a fourth set of opposed wiper wings 34, 36. In an actual use situation, it is envisioned that during one directional movement of the wiper 12, one-half of each set of wings 26–36 will engage a window to assist in removing debris, as well as heating the surface thereof. During a return stroke of the wiper blade 12, the opposed set of wings 26–36 will engage the windshield 16. In this respect, the wiper wing 14 is expected to be of an extremely flexible construction, most desirably for use during a rainstorm, and this flexibility will allow the entire wiper blade 12 to collapse against the windshield 16 so as to bring the wings 26–36 in engagement during the back and forth movement of an associated blade carrier arm.

Figure 5:
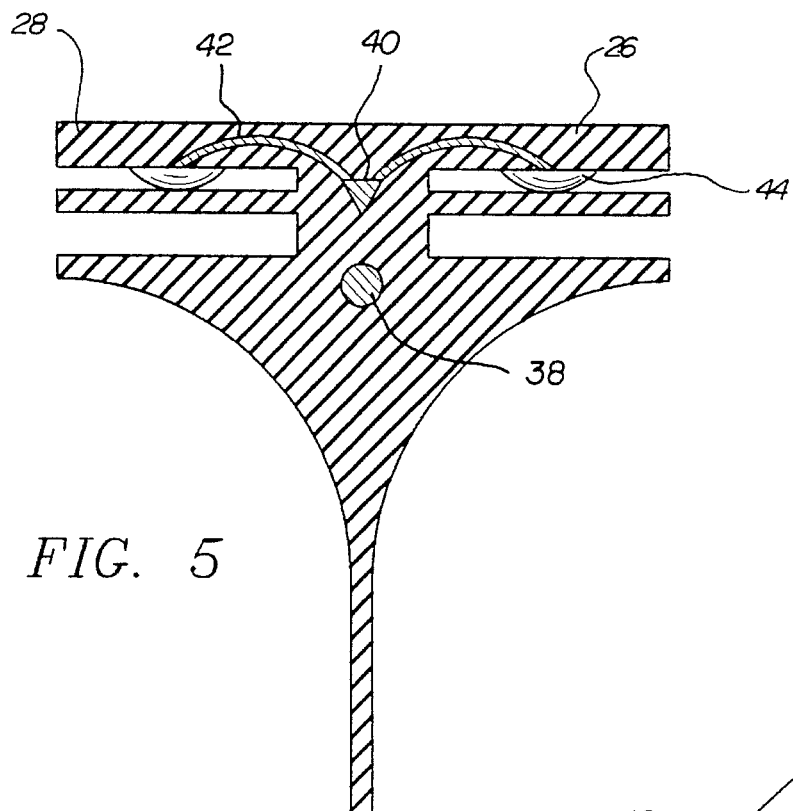
FIG. 5 is a cross-sectional view of the invention as viewed along the line 5—5 in FIG. 2.
Figure 6:
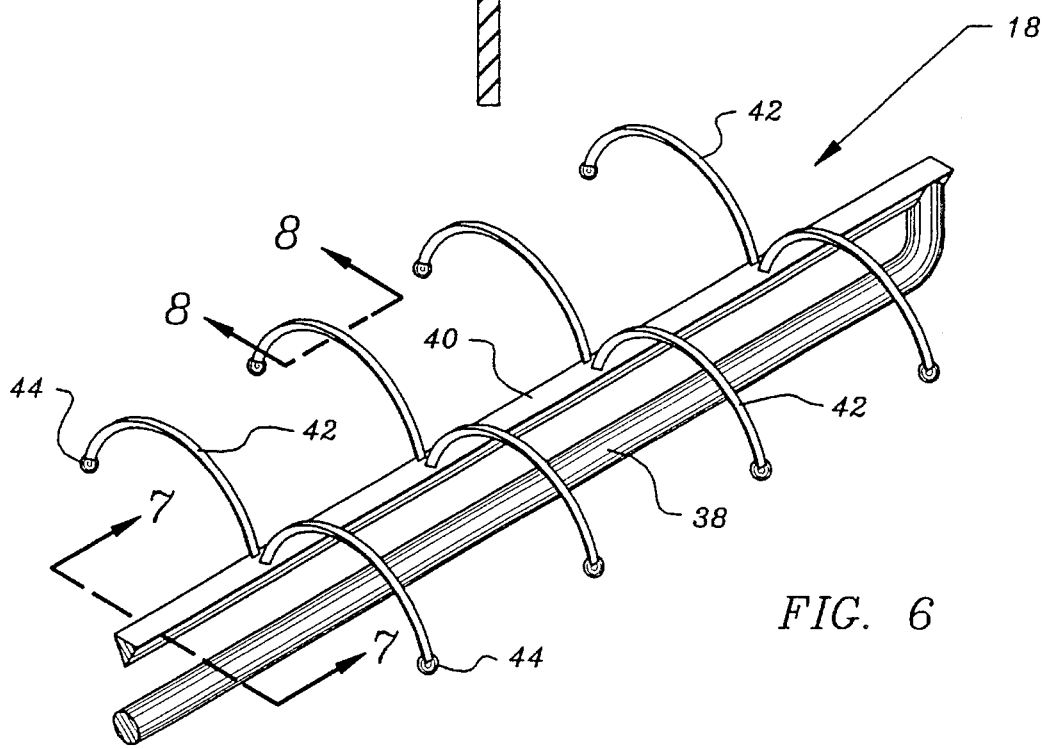
FIG. 6 is a perspective view of the resistance wiring member utilized within the wiper blade forming the present invention.

With particular reference to FIGS. 4, 5 and 6, it can be seen that the heating element 18 includes a center core member 38 which extends throughout the entire axial length of the blade 12 with a remote end thereof being integrally attached to a second core member 40 which is parallelly aligned with and juxtaposed to the first core member. The second core member 40 extends along substantially the entire axial length of the blade 12 as best shown in FIG. 4.

As best illustrated in FIGS. 5, 6, 7 and 8, the second core member 40 includes a plurality of arched, outwardly extending branch members, each of which are generally designated by the reference numeral 42, and each of which is integrally attached to and in electrical communication with the core member 40. Each of the branch members 42 are provided with metallic electrical contacts 44 on remote ends thereof, and these contacts extend outwardly through the second wings 26, 28 so as to be located on an exterior surface thereof. The metallic contacts 44 are fixedly secured to the branch members 42 and are in electrical communication therewith. The metallic contacts 44 are designed to abut against the third wings 30, 32 and are further designed to slidingly engage metallic contact surfaces of a windshield wiper blade carrier arm of a type which is already conventionally available. The metallic contacts 44 operate to complete the electrical circuit required to allow electrical energy to be delivered through the electrical wire 22 whereby a heating function can be performed by the core members 38, 40 within the blade 12.

The arched construction of the branch members 42 is relevant to the extent that a spring-like effect is achieved between the second core member 40 and the unillustrated blade carrier arm, thereby to facilitate a good electrical contact between the contacts 44 and the metallic surfaces of the blade carrier arm, and to further ensure a tight frictional retention of the blade 12 in engagement with the blade carrier arm. As such, the branch members 42 effectively operate as the engagement means for holding the blade 12 attached to a blade carrier arm, while also serving as the electrical circuit closing means with respect to the heating element 18 retained within the blade.

Figure 7:
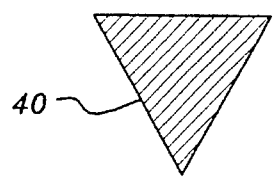
FIG. 7 is a cross-sectional view of the resistance wiring as viewed along the lines 7—7 in FIG. 6.
Figure 8:
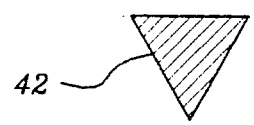
FIG. 8 is a cross-sectional view of a branch member as viewed along the lines 8—8 in FIG. 6.

Inasmuch as the wings 26–36 are designed for cleaning a windshield 16, it is apparent that torsional movement of the branch members 42 and the second core member 40 will occur, whereby eventually the polymeric material surrounding the core member and branch members will deteriorate. This could result in a loss of heat conduction within the blade 12, as well as a tearing away of the blade from the core member 40. If the core member 40 and the branch members 42 were of a circular cross-section, much more rapid deterioration of the polymeric material surrounding these members would occur. As such, as best illustrated in FIGS. 7 and 8, the core member 40 and the branch members 42 are of a triangular cross-sectional shape inasmuch as it has been discovered that this prevents relative rotational movement between these members and the surrounding polymeric material. By the same token, the core member 40 is of an enlarged circular shape since it is more deeply embedded within the polymeric material forming the blade. This enlarged diameter core member 38 provides less resistance to the electrical current flowing therethrough, whereby substantially no heat energy is dissipated to the blade 12. Inasmuch as the core member 40 and the branch members 42 are of a much smaller cross-sectional area, substantial electrical resistance occurs which thus results in an increased heating effect. This increased heating effect is experienced primarily in the thicker wiper wings 26, 28 which come into initial engagement with ice, sleet and snow during a movement of the blade support arm.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A heated windshield wiper blade construction comprising:

a flexible polymeric wiper blade selectively attachable to an existing movable metallic wiper blade support arm attached proximate and movable relative to a vehicle windshield, said wiper blade including a flexible first wiper wing extending along an axial length of said wiper blade and being engageable with said windshield to perform a conventional windshield wiping and cleaning function, and further including at least one flexible second wiper wing, said second wiper wing being orthogonal to and axially aligned with said first wiper wing, said second wiper wing also being engageable with said windshield during said wiping and cleaning function; and a heating element interiorly disposed within said wiper blade and extending substantially along and through an axial length of said wiper blade, said heating element including a central core member extending through said axial length of said wiper blade and further including a plurality of branch members attached to and extending substantially orthogonally outwardly from said center core member, said branch members functioning to deliver and dissipate heat through said at least one second wiper wing, thereby to permit said at least one second wiper wing to selectively heat an exterior surface of said windshield during relative movement between said wiper blade and said windshield.

2. The heated windshield wiper blade construction as described in claim 1, wherein said at least one second wiper wing is integrally attached to said first wiper wing.

3. The heated windshield wiper blade construction as described in claim 2, wherein said branch members are integrally attached to said center core member.

4. The heated windshield wiper blade construction as described in claim 3, wherein said branch members are arched upwardly and then downwardly relative to said center core member, thereby to provide a spring-like gripping function between said wiper blade support arm and said wiper blade.

5. The heated windshield wiper blade construction as described in claim 4, wherein remote ends of said branch members exit through an exterior surface of said at least one second wiper wing, said remote ends having semi-spherical metal contacts attached thereto, said metal contacts serving to frictionally grip said wiper blade support arm, thereby to retain said wiper blade in removable engagement with said wiper blade support arm, said metal contacts further serving to close an electrical circuit between said center core member, said branch members, and an associated vehicle electrical supply source, whereby electrical heat energy is generated within said wiper blade.

6. The heated windshield wiper blade construction as described in claim 5, wherein said center core member is of a triangular cross sectional shape, thereby to effectively anchor said center core member against rotational movement within said wiper blade so as to lessen wear and deterioration between said wiper blade, said center core member and said branch members.

7. The heated windshield wiper blade construction as described in claim 6, and further including a second core member in axial alignment with and parallel to said center core member, said second core member being substantially embedded within said wiper blade and lying in a juxtaposed position relative to said center core member.

8. The heated windshield wiper blade construction as described in claim 7, wherein said second core member is integrally attached to said center core member.

9. The heated windshield wiper blade construction as described in claim 8, wherein said second core member is of a circular cross section and is also of a greater cross sectional area relative to said center core member, whereby electrical resistance is reduced and the attendant heat generated thereby is similarly reduced within said second core member, thereby facilitating the heating of said center core member to a greater degree than said second core member.

10. The heated windshield wiper blade construction as described in claim 5, wherein said branch members are of a triangular cross sectional shape, thereby to effectively anchor said center core member against rotational movement within said wiper blade so as to lessen wear and deterioration between said wiper blade, said center core member and said branch members.

* * * * *